Dec. 23, 1941.    C. E. LINEBARGER    2,267,115
HYDROMETER
Original Filed Jan. 9, 1937    2 Sheets-Sheet 1

Inventor:
Charles E. Linebarger, deceased.
By Charles E. Linebarger Jr.
Administrator.
By E. J. Andrews
ATTY.

Dec. 23, 1941.   C. E. LINEBARGER   2,267,115
HYDROMETER
Original Filed Jan. 9, 1937   2 Sheets-Sheet 2

Inventor.
Charles E. Linebarger, deceased:
By Charles E. Linebarger, Jr.
Administrator.
BY E. J. Andrews
ATTY.

Patented Dec. 23, 1941

2,267,115

UNITED STATES PATENT OFFICE 2,267,115

HYDROMETER

Charles E. Linebarger, deceased, late of Chicago, Ill., by Charles E. Linebarger, Jr., administrator, Chicago, Ill., assignor to The Chaslyn Company, Chicago, Ill., a corporation of Illinois Original application January 9, 1937, Serial No. 119,735. Divided and this application January 7, 1939, Serial No. 249,742

4 Claims. (Cl. 265—45)

This invention relates to hydrometers, and particularly to hydrometers which are designed to very accurately indicate the density of the liquid involved independently of temperature changes. In a copending patent application, Serial No. 55,765, filed December 23, 1935, there are described some uses of thermostats applied to the rotating elements of hydrostatic vanes for the purpose of correcting their density readings for changes of temperature. In the present application there are given additional means to bring about such corrections, incorporated not only in the movable vane or hand or dial, but also in the scale sheet, as such, and other means, being applicable also to different kinds of hydrometers, as, for instance, constant weight float hydrometers.

One object of the present invention is to provide apparatus mounted within the bulb or barrel of a constant weight float hydrometer by means of which the scale sheet is shifted to and fro so as to bring its readings in accord with those corrected for temperature variations. A second object of the invention is to fit thermostatic means to hydrometer vanes whereby the scale sheets are moved to change the density indications, when the liquids under test are heated, by amounts commensurate with their changes in density owing to the changes in temperature.

A third object is to introduce mechanical means into a hydrometric assembly between the scale and the thermostat, so as to convert the uniform thermostatic motion into an irregular motion designed to match the irregular change in density of a liquid owing to its change in temperature. Other objects of the invention will be apparent from a consideration of the drawings herewith and the following descriptions thereof.

This application is a division of copending patent application Serial No. 119,735, filed January 9, 1937, which matured into Patent Number 2,185,205 January 2, 1940, and reference may be had to that patent in regard to further details relating to the objects and apparatus of the invention.

Figure 1:
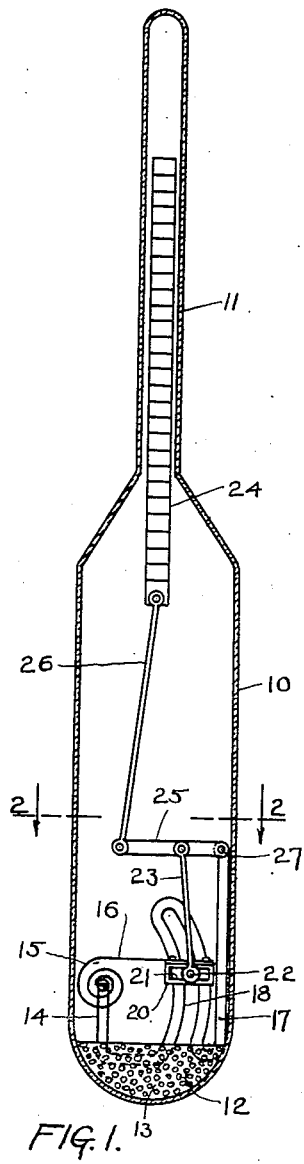
Figure 2:
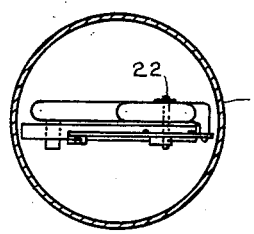

Of the accompanying drawings, Fig. 1 is an elevation of a constant weight hydrometer which embodies some of the features of this invention; Fig. 2 is an enlarged sectional view along the line 2—2 of Fig. 1; Fig. 3 to Fig. 7 illustrate by similar views modifications of the hydrometer illustrated in Fig. 1.

Fig. 1 illustrates a hydrometer of the constant weight barrel or bulb type. This comprises a glass tube or barrel 10 with an elongated stem or neck 11, which is completely sealed and encloses in its lower end any suitable ballast, such as the shot 12. In this case the shot is preferably held in place by means of the wax 13. Within the tube is fixed a support 14, which in this instance is anchored in the wax 13. The upper end of the arm of the support 14 has fixed to it a bi-metal coil 15 which has an outwardly extending arm 16. Also anchored in the wax is a frame 17 which has formed therein a slot 18. The outer end of the arm 16 carries a block 20 which has therein a slot 21. In this slot plays a pin 22 free to move therein longitudinally. The pin also plays freely in the slot 18. This latter slot has one portion at least which is nonconcentric with reference to the center of the coil 15. The pin 22 has pivoted thereto the lower end of a link 23 which carries a scale 24 by means of the lever 25 and the link 26. The fulcrum of the lever is pivotally attached to the frame 17.

The purpose of this slot structure is to compensate for any variations in the scale movement from the density changes of the liquid being tested owing to temperature changes thereof.

In operation, as the temperature of the liquid increases above normal, the outer end of the arm 16 will rise by virtue of the action of the unlike metals of the bimetal coil 15. This will elevate the scale. At the same time owing to the decreased density of the liquid the hydrometer will sink, hence, without compensating for the change in temperature the reading of the hydrometer for normal temperatures would be incorrect. But as the hydrometer sinks the scale will be elevated by the coil, and this will compensate generally for the temperature change.

With the slot arrangement described compensation is not only provided for the temperature changes but also for any irregularities in the rate of change of the density with reference to the temperature change. At certain temperatures the density may vary at a greater rate with a given temperature change than at other temperatures. This is compensated for by the slot arrangement. As the outer end of the arm 16 rises owing to the increasing temperature the scale sheet will be elevated, but the upward movement of the scale sheet will not correspond with the expansion of the liquid in some cases. But by having the slot 18 nonconcentric with reference to the center of the bimetal coil the movement of the scale may be made to vary from the rate of movement of the pin 22 by which it is operated. If the nature of the liquid under test is such that its density decreases at a greater rate than the temperature increase the radius of curvature of the slot may be increased as it passes upwardly so as to force the pin outwardly from the center of the coil and increase the rate at which the scale is elevated.

Also the shape of the slot may be made to compensate for the variation in rate of movement of the scale owing to the movement of the arm end and the lever end. As they move upwardly from the positions shown in the drawings the vertical movement rate decreases, thus decreasing the rate of upward movement of the scale. Again by increasing the radius of the curvature of the slot this decrease in the movement of the scale can be compensated for. By properly shaping the slot the indications of the scale may be compensated for for any peculiarity of the liquid or the mechanism.

Figure 3:
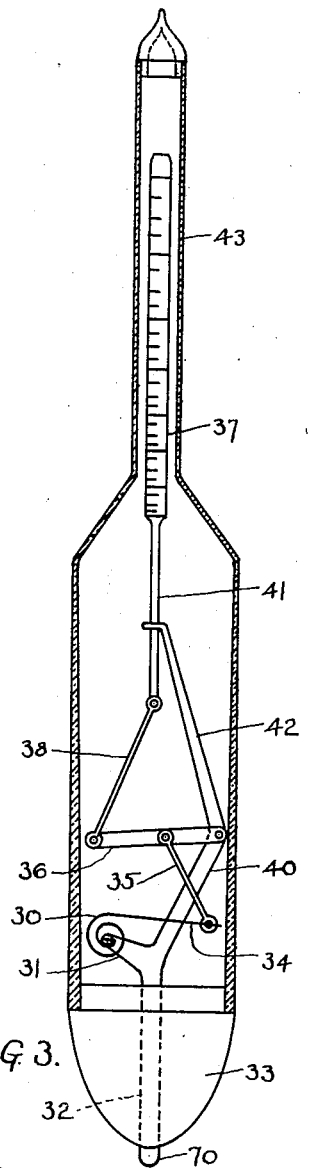
Figure 4:
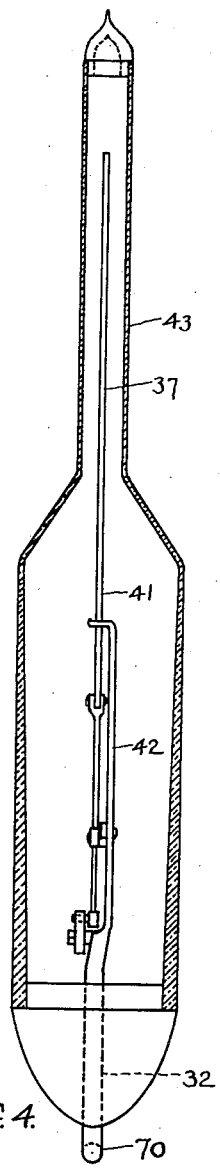

Figs. 3 and 4 illustrate further use of the bimetal element for making corrections of the scale movement or readings. In this case the bimetal coil 30 is fixed to the arm 31 which in turn is fixed to a pedestal 32 anchored in the ballast 33. The outer end of the arm 34 of the coil is pivoted to a link 35, the upper end of which is pivoted to a lever 36 which operates the scale 37 by means of a link 38. The lever 36, is pivoted to another arm 40 of the pedestal 32, and the link 41, which connects the link 38 with the scale 37, is guided by an extension 42 of the arm 40.

As the expansion of the liquid under test, owing to its increased temperature, allows the hydrometer to sink more in the liquid, the unwinding of the coil, owing to its increased temperature, will cause the scale to be elevated with reference to the stem 43, so as to compensate, so far as the density readings are concerned, for the sinking of the hydrometer in the liquid because of its decreased density. As will be readily understood, the scale is elevated in the stem 43 by means of the action of the lever and the links, as the coil 30 unwinds.

Also, it is to be understood that in these various modifications the leverage may be increased by additional levers, or by other methods of increasing or magnifying the movements of the scale or the effective movements of the outer end of the arm of the bimetal coil. Also it is to be understood that Fig. 4 is merely a view of Fig. 3 rotated through 90°.

Figures 5, 7:
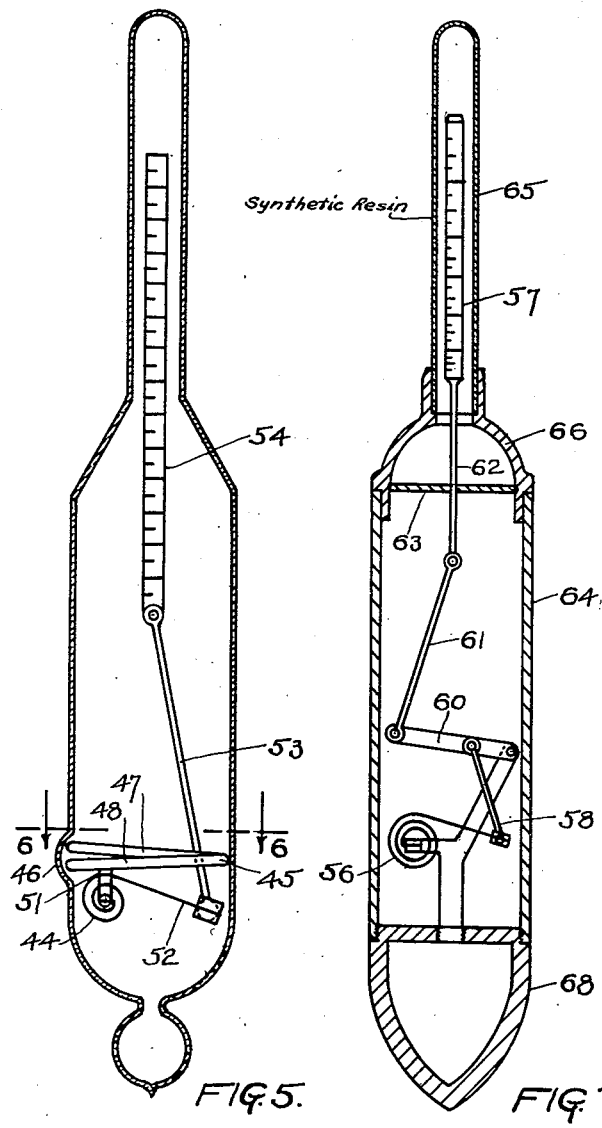
Figure 6:
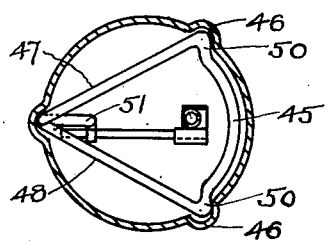

Figs. 5 and 6 illustrate a further modification in which the bimetal coil 44 is used, Fig. 6 being a view along the line 6—6 of Fig. 5. In this case the support 45 for the coil is held in place in the barrel by the protrusions 46 formed in the wall of the barrel. The frame which forms the support 45 is composed of elastic material and is triangular shaped and each corner projects into a protrusion 46. In order that the frame may be assembled in the barrel, the arms 47 and 48 are disconnected and lap on each other so that the arms may be sprung together sufficiently to allow the corners 50 to be slipped into their protrusions. When the arms are released the frame will spring in place and will be firmly held by the protrusions. An arm 51, projecting inwardly and downwardly from the arm 48, serves to throw the coil free from the barrel wall and the frame.

The outer end of the arm 52 of the coil is pivoted to the lower end of a link 53, which in turn carries the scale 54. In this case no means are shown to compensate for any irregularities in movement or expansion of the liquid; but obviously those described elsewhere could be applied to this modification, and additional leverage also could be applied.

Fig. 7 illustrates a somewhat similar arrangement. The coil 56 is bimetallic and operates the scale 57 by means of a link 58, a lever 60 and a link 61. The link 62 which connects the link 61 and the scale is guided by a cross bar 63. In this case the barrel 64 is assembled and it comprises the stem 65 which is connected to the wall of the barrel 64 by a tubular member 66. The lower end of the stem is pressed into and sealed in the upper end of the member 66, and the lower end of the member 66 is pressed into and sealed in the upper end of the barrel. The stem may be made of any transparent material, such as ordinary glass or glass constructed from organic material, so-called organic or synthetic glass. The member 66 and the barrel may be made of any suitable material, such as metal or glass or some plastic material. The stem, which is necessarily transparent, is preferably formed of methyl methacrylate resin plastics or those having similar characteristics. Since, in the case of the constant weight float hydrometers the thermostats and the metal parts connecting them to the scales are enclosed, and are thus protected against any possibility of corrosive action, these parts may be composed of any ordinary material, such as tinned iron or the like.

In this case, also, the ballast end is fastened in the lower end of the barrel, being preferably threaded therein. This end may be made of any plastic material which is suitable, or it may be made of material sufficiently dense to provide for the ballasting of the hydrometer. Preferably, the metal tip 68 is used, which is of sufficient weight to properly sink and hold the hydrometer in the liquid to be tested. With a tip of this nature, the desired weight of the hydrometer may be accurately obtained by filing off a portion of the tip, which is intentionally initially made somewhat too heavy. This same method of adjusting the hydrometer weight may be used in case of the hydrometers such as those illustrated in Figs. 3 and 4. In such cases the pedestal 32 is not only anchored in the plastic material 33 but it also projects out through the lower end thereof and this projecting tip 70 may be filed or ground off somewhat to reduce the weight of the apparatus as desired for calibration.

The materials of which the laminations of the bimetal element are composed have not been shown in the drawings; but in some cases the composition of the laminations becomes important. These bimetal coils may be made of various materials so as to vary materially the deflection constants; and also so that the deflection constant will vary with varying temperatures. In their use with the invention it is preferred to provide laminations which will give deflection constants corresponding to the coefficient of expansion of the liquid to be tested, and in some cases, if the coefficient varies somewhat with the temperature, bimetal coils can be provided which will give varying movements corresponding with the varying coefficients. In such cases the compensating means herein described to correct for irregularities are unnecessary, except they may be desirable to correct for irregularities in the action of the mechanism itself.

In cases where the thermostatic members of hydrometers may come in contact with corrosive liquids, means are applied to prevent any chemical action upon the materials. Electroplating the metals of the bimetal elements with cadmium or tin, preferably with a coat of each at least 0.005 inch thick prevents corrosion except in cases of strong solutions of acids or alkalies. For these may be used laminated metals rolled out of thin sheets of gold, or other suitable inert material, covering a thick sheet of base metal, any edges exposed by the cutting of the edges of the metal combination being electroplated with the inert material.

I claim as his invention:

1. A hydrometer comprising a sealed tube, a scale movably mounted in the tube and adapted to indicate the depth to which the tube sinks when immersed in a liquid the density of which is to be tested, means responsive to temperature variations of the liquid, fixed with reference to the tube and operatively connected with the scale, and comprising a bi-metal coil having a projecting arm, and means operatively connecting the arm with the scale, comprising a lever, a fulcrum connection between one end of said lever and a part fixed to the tube, a link connecting the free end of the lever to the scale, and a link connecting the arm of the bi-metal coil to the lever at a point between the fulcrum and the first mentioned link, whereby movements of the arm of the bi-metal coil are communicated in multiplied amount to the scale, substantially as described.

2. A hydrometer comprising a sealed tube, a scale movably mounted in the tube and adapted to indicate the depth to which the tube sinks when immersed in a liquid the density of which is to be tested, means responsive to temperature variations of the liquid, fixed with reference to the tube and operatively connected with the scale, comprising a bi-metal coil having a projecting arm, and means operatively connecting the arm with the scale, comprising a block fixed to the arm, a frame fixed to the tube, the block and frame having adjacent overlapping slots, and a link with one end slidably connected to both slots and the other end operatively connected to the scale, substantially as described.

3. A hydrometer comprising a sealed tube, a scale movably mounted in the tube and adapted to indicate the depth to which the tube sinks when immersed in a liquid the density of which is to be tested, means responsive to temperature variations of the liquid, fixed with reference to the tube and operatively connected with the scale, comprising a bi-metal coil having a projecting arm, and means operatively connecting the arm with the scale, comprising a lever, a fulcrum connection between said lever and a part fixed to the tube, and link connections between the lever and the scale, and also between the lever and the arm, said part fixed to the tube including a stem extending through the tube to the exterior thereof, substantially as described.

4. A hydrometer comprising a sealed tube, a scale movably mounted in the tube and adapted to indicate the depth to which the tube sinks when immersed in a liquid the density of which is to be tested, means responsive to temperature variations of the liquid, fixed with reference to the tube and operatively connected with the scale, comprising a bi-metal coil having a projecting arm, and means operatively connecting the arm with the scale, comprising a lever, a fulcrum connection between said lever and a part fixed to the tube, and link connections between the lever and the scale, and also between the lever and the arm, said part fixed to the tube including a removable section having removable connection to the tube, and also including a stand element carried by said removable section and having a suitable fulcrum as aforesaid, substantially as described.

CHARLES E. LINEBARGER, JR.,
*Administrator of the Estate of Charles E. Linebarger, Deceased.*